US006016160A

United States Patent [19]
Coombs et al.

[11] Patent Number: 6,016,160
[45] Date of Patent: Jan. 18, 2000

[54] COMBINATION HEAD-PROTECTIVE HELMET AND THERMAL IMAGING APPARATUS

[75] Inventors: Christopher E. Coombs, Boonton; Robert J. Richter, Cranbury; Richard M. Peel, Gibbstown, all of N.J.; Andrew J. Fordham, Roswell, Ga.

[73] Assignee: Cairns & Brother Inc., Clifton, N.J.

[21] Appl. No.: 09/228,849

[22] Filed: Jan. 12, 1999

Related U.S. Application Data

[63] Continuation of application No. 08/042,044, Mar. 31, 1993.

[51] Int. Cl.[7] ............ H04N 7/18; H04N 9/47; A61B 1/04

[52] U.S. Cl. ............ 348/61; 348/64; 348/73

[58] Field of Search ............ 348/61, 64, 73, 348/164, 169, 115, 143; 128/26, 202; 358/105, 229; 359/13, 410, 411, 480, 630; H04N 9/47, 7/18; A61B 1/04

[56] References Cited

U.S. PATENT DOCUMENTS

| | | | |
|---|---|---|---|
| 4,156,292 | 5/1979 | Helm et al. | 2/6 |
| 4,286,339 | 9/1981 | Coombs | 2/414 |
| 4,449,787 | 5/1984 | Burbo et al. | 350/538 |
| 4,970,589 | 11/1990 | Hanson et al. | 348/158 |
| 5,044,016 | 9/1991 | Coombs | 2/414 |
| 5,089,914 | 2/1992 | Prescott | 359/815 |
| 5,420,828 | 5/1995 | Geiger | 367/131 |
| 5,856,811 | 1/1999 | Shih et al. | 345/8 |

*Primary Examiner*—Howard Britton
*Assistant Examiner*—Nhon T. Diep
*Attorney, Agent, or Firm*—R. Gale Rhodes, Jr.

[57] ABSTRACT

Combination head-protective helmet which includes a cap and an outwardly extending brim and thermal imaging apparatus which includes an infrared camera for producing an infrared image of a scene or object and a display system which generates a visible image of the scene or object from the infrared image, the camera is mounted underneath the brim of the protective helmet for protection against e.g. falling objects and the display system is mounted on the helmet in a position to permit a person wearing the combination to see the visible image.

21 Claims, 8 Drawing Sheets

13
12
10
21
20
14
15
C
17
16
L
V
D
F 13
12
10
21
20
14
15
C
17
16
L
V
F
D 13
12
10
14

18
17C
20
23
22
17
16
23A
17A
17B
19
25

12
60
146
148
145
35
20
140
143
142
37
45
38
48

22A
63
61
65
64

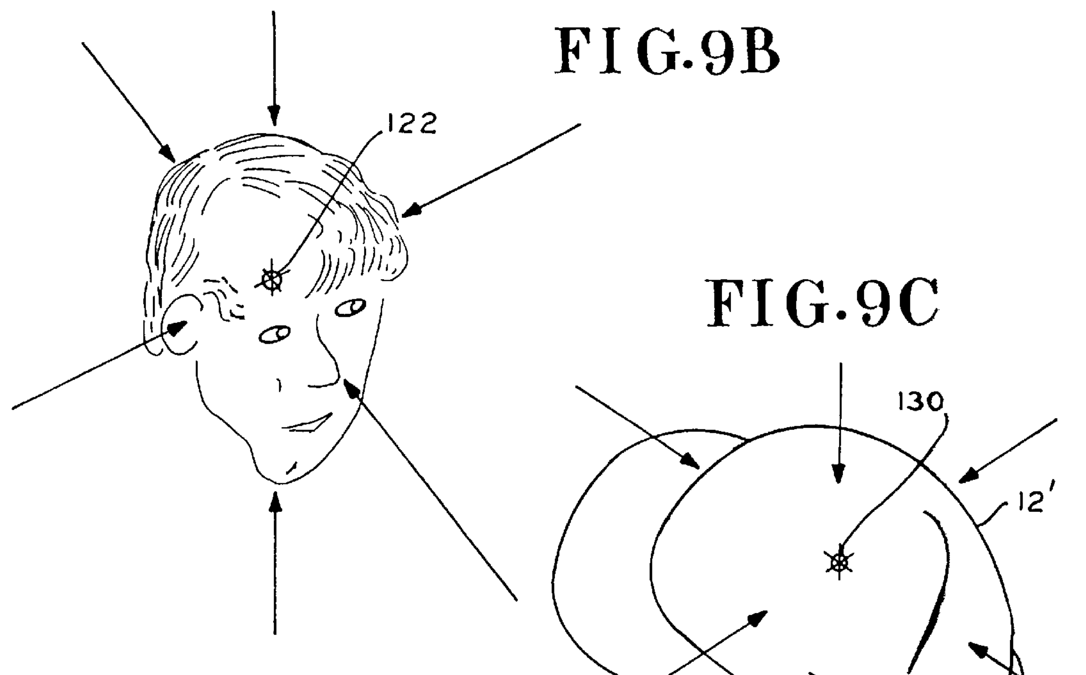
FIG. 9B
122
FIG. 9C
130
12'
D
122
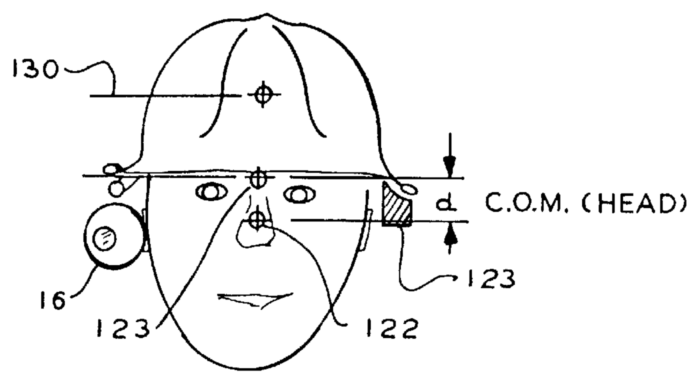
FIG. 9D
130
d
C.O.M. (HEAD)
123
16
123
122
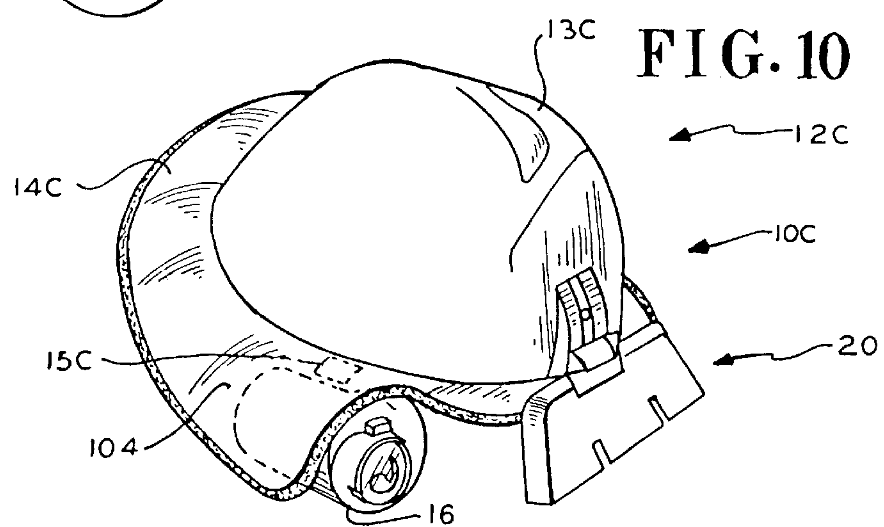
13C
FIG. 10
12C
14C
10C
20
15C
104
16

COMBINATION HEAD-PROTECTIVE HELMET AND THERMAL IMAGING APPARATUS

CROSS-REFERENCE TO RELATED APPLICATIONS

This application is a continuation of U.S. patent application Ser. No. 08/042,044, filed Mar. 31, 1993, Christopher E. Coombs, et al., inventors, entitled COMBINATION HEAD-PROTECTIVE HELMET AND THERMAL IMAGING APPARATUS and assigned to the same assignee as this application.

BACKGROUND OF THE INVENTION

This invention relates to a new and improved head-protective helmet and thermal or infrared imaging apparatus. The helmet provides the wearer of the combination with head protection against falling objects in a hostile environment, such as for example a fire, and the thermal imaging apparatus provides the wearer with a thermal or infrared image in the wearer's field of view permitting the wearer to see objects radiating thermal energy in the infrared spectrum which otherwise would be obscured from the wearer's view due, for example, to dense smoke encountered in a fire; the thermal imaging apparatus also permits viewing of fire or other hot spot radiating energy in the infrared range but obscured, for example, by a wall or roof. In a preferred embodiment of the present invention, the invention relates to a new and improved fireman's helmet and thermal or infrared imaging apparatus.

Numerous head-protective helmets are known to the art, such as for example the FIREMAN'S HELMET WITH ENERGY ABSORBING LINER disclosed in U.S. Pat. No. 4,286,339 issued Sep. 1, 1981 to Peter A. Coombs inventor and the PROTECTIVE HELMET ASSEMBLY INCLUDING RELEASEABLE HEAD RETAINING ASSEMBLY disclosed in U.S. Pat. No. 5,044,016 issued Sep. 3, 1991 to Christopher E. Coombs, both patents assigned to the same assignee as the present invention. These patents are hereby incorporated by reference as if fully reproduced herein. Also, numerous thermal or infrared imaging apparatus are known to the art for providing a person with an image of objects radiating energy in the infrared range. Also known to the art are combination helmet and thermal camera arrangements such as disclosed in U.S. Pat. No. 5,089,914 issued Feb. 18, 1992 to James A. Prescott, inventor, and assigned to EEV Limited.

However, there still exists a need in the art for new and improved combination head-protective helmet and thermal imaging apparatus which is particularly useful when embodied as a combination fireman's helmet and thermal imaging apparatus wherein the thermal imaging apparatus is mounted advantageously to the fireman's helmet to reduce discomfort to the fireman and to provide the fireman with hands-free wearing of the combination thereby facilitating the fireman's ability to wear the combination while engaged in fire fighting and which combination provides the fire fighter with the thermal image of objects he cannot otherwise see with his natural eyesight, such as for example bodies of unconscious but alive fire and smoke victims present at a fire scene. There also exists a need in the fire fighting art for mounting the thermal or infrared sensor camera of such thermal imaging apparatus in a temperature protected manner so as to reduce the influence of a heated environment such as is present at a fire scene, on the camera which is thermal sensitive.

SUMMARY OF THE INVENTION

It is the object of the present invention to satisfy the foregoing need in the art.

Combination head-protective helmet and thermal imaging apparatus satisfying the foregoing need and embodying the present invention may include a head-protective helmet including a cap and an outwardly extending brim, thermal imaging apparatus including an infrared sensor camera for producing an infrared image of a scene or object and a display system which generates a visible image of the scene or object from the infrared image which visible image can be viewed by a person wearing the combination, the camera being mounted to the helmet generally underneath the brim to protect the camera from falling objects striking the helmet, and to place the camera in a temperature protected environment, and the display system being mounted to the helmet in a position to permit the person wearing the combination to see the visible image.

DESCRIPTION OF THE DRAWINGS

FIGS. 9A–9D are a series of views indicating the counter balance feature of the present invention;

FIG. 10 is a perspective view illustrating a further embodiment of the present invention;

DETAILED DESCRIPTION OF THE DRAWINGS

Figure 1:
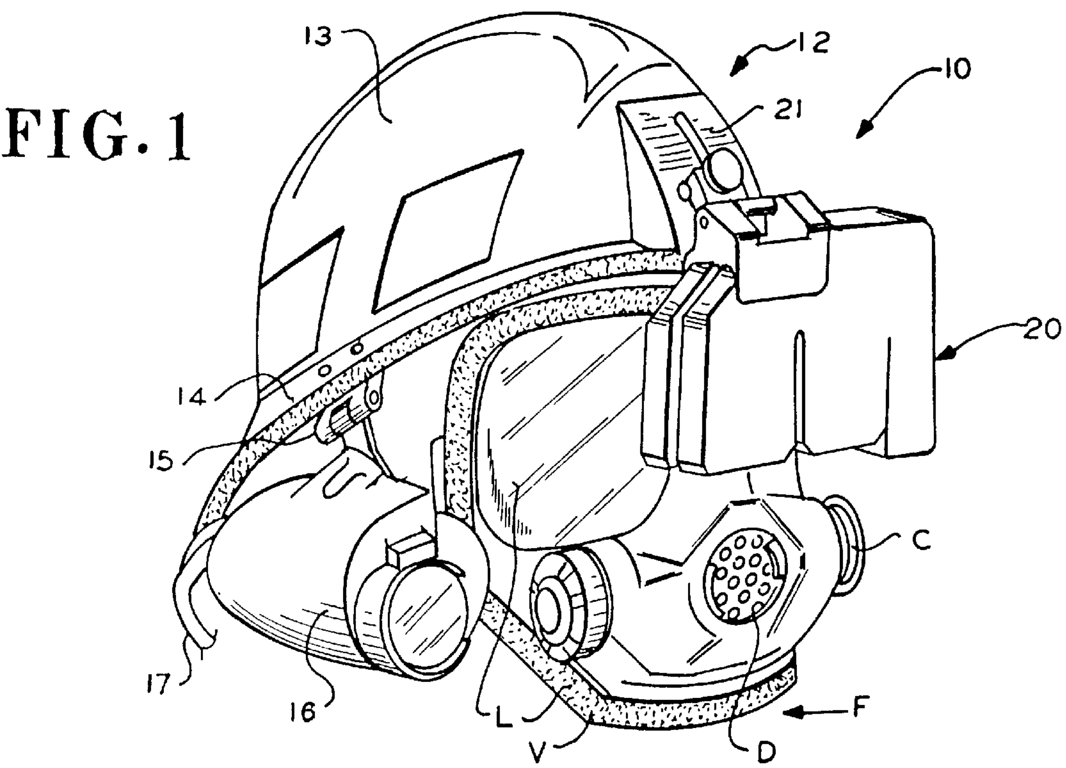
FIG. 1 is a perspective view of combination head-protective helmet and thermal imaging apparatus of the present invention.
Figure 2:
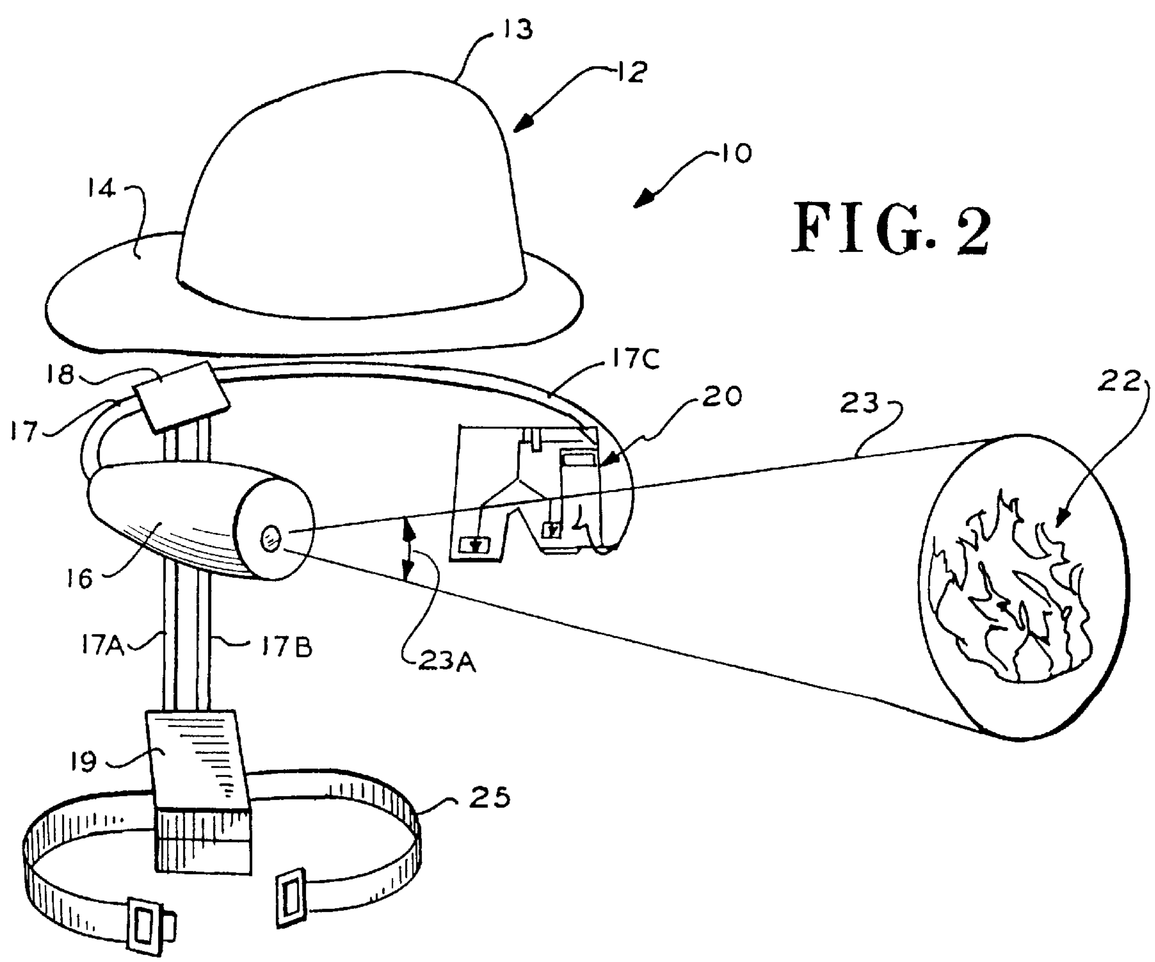
FIG. 2 is a diagrammatical illustration of the combination head-protective helmet and thermal imaging apparatus of the present invention illustrating diagrammatically the taking of a thermal image.

Referring now to FIGS. 1 and 2, there is illustrated combination head-protective helmet and thermal imaging apparatus embodying the present invention and indicated by general numerical designation 10. In the preferred embodiment, the head protective helmet is embodied as a fireman's helmet indicated by general numerical designation 12 and including a cap 13 and an outwardly extending brim 14. Apparatus 10 further includes a thermal or infrared sensor camera 16 mounted to and residing generally under the brim 14 by a pivotable mounting member 15 and which camera is connected by a suitable cable 17 to a junction box 18, FIG. 2, and therefrom over cable 17A to a suitable combination signal processing and battery power supply 19 which supplies power to the apparatus 10 and converts the thermal image signals from the camera 16 to television or TV signals in a manner known to the art; combination signal processing and power supply 19 may be mounted suitably on a fireman's belt 25. The TV signals are transmitted by a suitable cable 17B to the junction box 18 and therefrom over a suitable cable 17C to a helmet mounted display apparatus indicated by general numerical designation 20. Display apparatus 20 is mounted to the helmet cap 13 by a mounting member 21 for movement with respect to the helmet 12 to permit the display apparatus 20 to be moved out of the field of view of the wearer of the combination apparatus 10 upon the wearer desiring to use his natural eyesight for viewing; such movable mounting of the display apparatus is described in detail below. As will be further understood from FIG. 1, and by further reference to FIG. 2, the thermal or infrared sensor camera 16 makes a thermal image, for example, of a fire scene radiating infrared energy and indicated by general numerical designation 22 in FIG. 2, and which scene may be from about six (6) feet, or about two (2) meters, to infinity from the sensor camera 16 and which thermal image, in the preferred embodiment, is subtended in a 36° field angle of view of the thermal sensor camera 16; the field angle of view is indicated by numerical designation 23 in FIG. 2 and the field angle is indicated by the curved arrow 23A. Similarly, the scene 22 could be that of an alive but unconscious fire or smoke victim radiating infrared energy. Mounting of the camera 16 generally under the brim 14 protects the camera from being struck by falling objects striking the top portions of the helmet cap 13 and brim 14.

As will be understood from FIG. 1, the display apparatus 20 of the present invention may be used in conjunction with a facepiece indicated by general numerical designation F of the type known to the art and which include a lens L, a breathing gas inlet connector C, speech diaphragm D and an exhalation or outlet valve V. It will be further understood that the mounting member 15 mounts the thermal sensor camera 16 in a position generally underneath the brim 14 such that the camera 18 is bathed and thereby cooled by exhalation gas or air exiting the exhalation valve V. Such cooling enhances the operation of the thermal or infrared sensor camera 18 particularly when it is present in a heated environment such as may be encountered at a fire scene.

Figure 3:
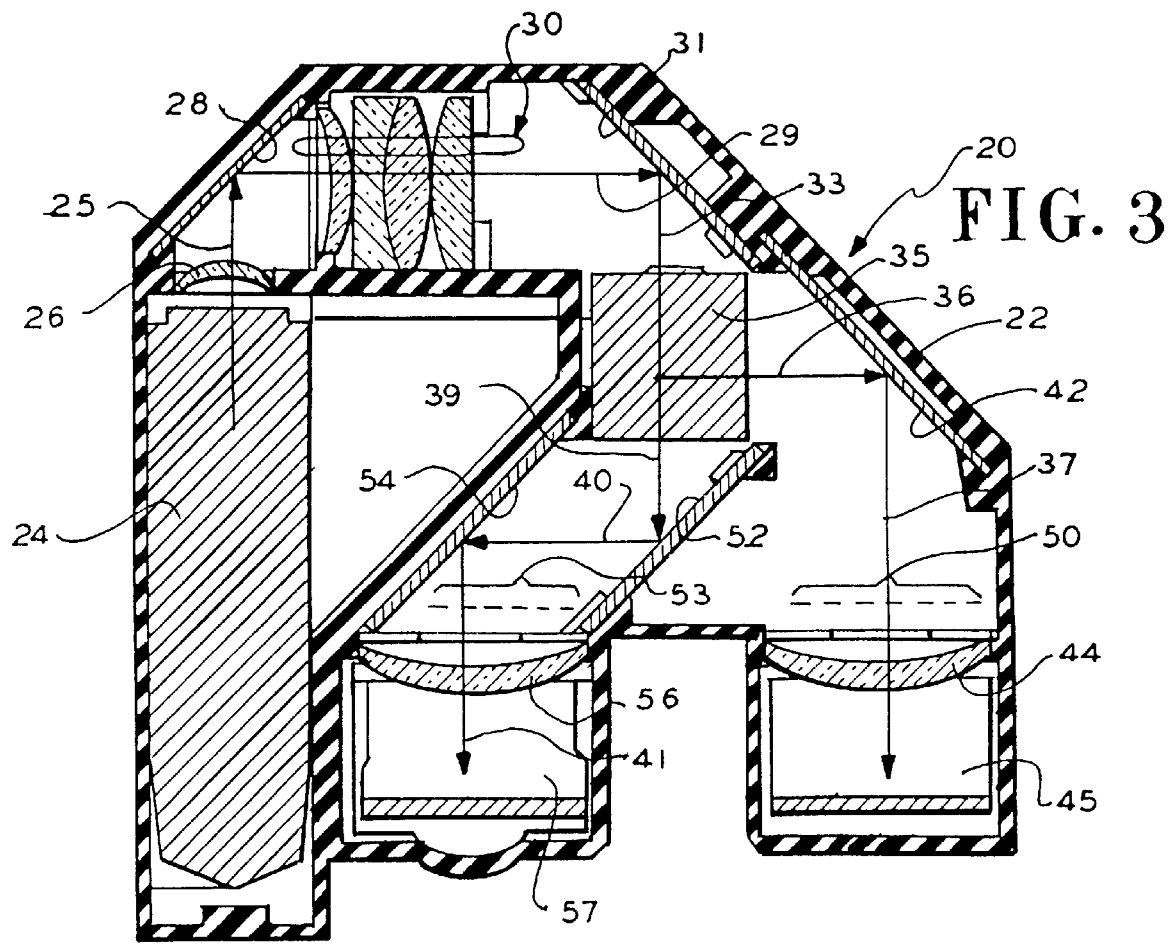
FIG. 3 is a vertical cross-sectional view taken generally through the display apparatus shown in FIG. 1 and as viewed outwardly.
Figure 4:
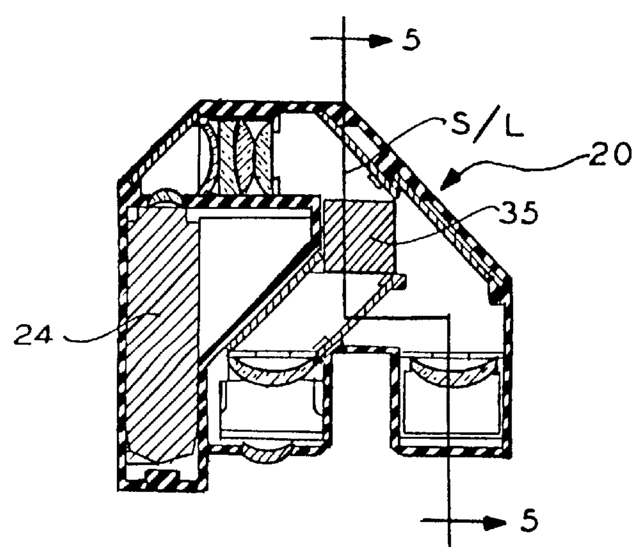
FIG. 4 is a reduced view of FIG. 3 and including the irregular section line S/L.
Figure 5:
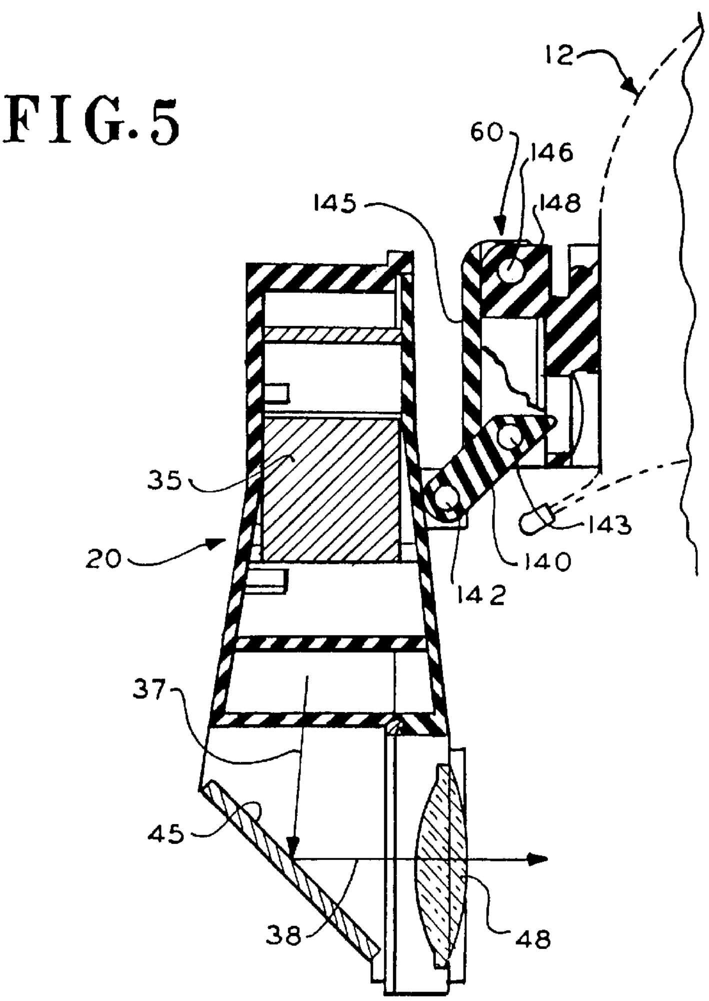
FIG. 5 is a cross-sectional view taken generally along the irregular section line S/L in FIG. 4 in the direction of the arrows.
Figure 6:
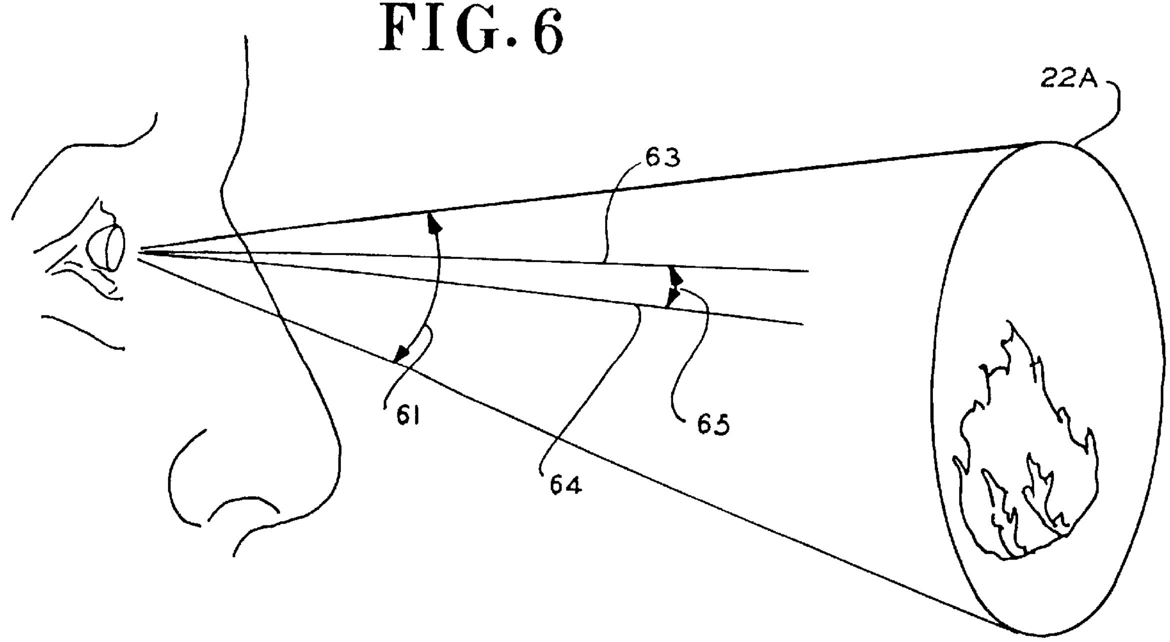
FIG. 6 is a diagrammatical illustration of the field of view angle of the virtual images produced by the present invention.

Referring now to FIGS. 3 and 5, and first to FIG. 3, it will be understood that the display apparatus 20 may include a suitably shaped housing 22 in which are suitably mounted a CRT or television tube 24 and the other optical elements shown in FIG. 3 and described below. The television tube 24 receives television signals from the combination signal processing and power supply 19 and produces a TV image of the scene 22 carried by light rays emanating from the TV tube 24. The light rays are provided with a ray path indicated by arrows 25, 29 and 33 extending from the television tube 24 to a suitable beam splitter 35, such light rays pass through a suitable field flattener lens 26, strike a suitable inclined mirror 28 and are reflected through a suitable relay lens group or grouping of the type known to the art and indicated by general numerical designation 30. Thereafter the light rays strike the inclined mirror 31 and are reflected into the beam splitter 35. The beam splitter 35 splits the light rays into two ray paths, one ray path indicated by arrows 36 and 37 in FIG. 3 and arrows 37 and 38 in FIG. 5 and being for the right eye of the wearer of the combination apparatus 10 of the present invention, and the other ray path indicated by arrows 39, 40 and 41 in FIG. 3 and being for the left eye of the wearer of the combination apparatus 10 of the present invention. The split light rays provided with the ray path indicated by arrow 36 in FIG. 3 strike a suitable inclined mirror 42 and are reflected as indicated by the arrow 37 through a suitable field lens 44 to a suitable mirror 45, FIGS. 3 and 5, where they are reflected to pass through a suitable aspheric lens 48, FIG. 5, which functions as an eyepiece for the right eye of the wearer of the combination apparatus 10 of the present invention. The field flattener lens 26, relay lens group 30, and the beam splitter 35 combine optically to produce an intermediate real image of the scene 22 in advance of the field lens 44 indicated by the dashed line and numerical designation 50 in FIG. 3. This intermediate real image 50 is transmitted through the field lens 44 to the aspheric lens 48, FIG. 5, which converts the intermediate real image 50 to a virtual image of the scene 22 in FIG. 2 which virtual image is viewed by the right eye of the wearer of the apparatus 10 as shown in FIG. 6 and which virtual image is indicated in FIG. 6 by numerical designation 22A; such virtual image will appear to float in front of the right eye of the wearer of the combination apparatus 10 of the present invention at a distance from about 3 to about 10 feet and will subtend a virtual image field angle of view of 36° in the preferred embodiment of the present invention. The virtual image field angle of view is indicated by curved arrow 61 in FIG. 6. Similarly, FIG. 3, the split light rays from the beam splitter 35 are reflected by the mirrors 52 and 54 and pass through a suitable field lens 56, strike a suitable mirror 57, and pass through a suitable aspheric lens, not shown, but the same as aspheric lens 48 shown in FIG. 5, to the left eye of the wearer of the apparatus 10; the field flattener lens 26, relay lens group 30 and beam splitter 35 combine, optically, to produce an intermediate real image of the scene 22 in advance of the field lens 56 and indicated by the dashed line identified by numerical designation 52. This intermediate real image is transmitted to the aspheric lens (not shown) which converts the intermediate real image 52 into a virtual image (not shown) of the scene 22 which is viewed by the left eye of the wearer of the apparatus 10; such virtual image will appear to float in front of the left eye of the wearer of the combination apparatus 10 at a distance of about 3 to about 10 feet and will subtend a virtual image field angle of view of 36° in the preferred embodiment of the present invention which virtual image is not shown in the drawings but will be understood to be the same as virtual image 22A in FIG. 6. It will be understood that such aspheric lens, not shown, functions as an eyepiece for the left eye of the wearer of the combination 10. The relay lens group 30 also performs any needed optical aberration correction.

It will be understood in accordance with the present invention that the field flattener lens 26 and the relay lens grouping 30 are located in advance of or prior to the beam splitter 35 to prevent magnification mis-match between the left and right eye paths. It will be further noted and understood that the real field angle of view, 23A of FIG. 2, of the thermal sensor camera 16 and the virtual image field angle 61 in FIG. 6 are equal whereby the magnification ratio of these field angles is unity to provide the wearer of the combination apparatus 10 of the present invention with scene imagery the same size as the scene would be viewed in the real world. This permits the wearer of the combination 10 of the present invention to obtain accurate depth perception by seeing objects at their real relative size.

Referring again to FIG. 6, a further feature of the combination apparatus 10 of the present invention is illustrated. Line 63 indicates the horizontal and line 64 indicates the center line of the field of view of the display apparatus 20, FIG. 3, of the present invention. It will be understood that the center line of the field of view of the display apparatus of the present invention is displaced at a downward angle with respect to the horizontal as indicated by the curved arrow 65. In the preferred embodiment of the present invention, this downward displacement angle was between 0° to 10°. This downward angle or displacement of the center line of the field of view of the display apparatus of the present invention has been found to present a more comfortable line of sight to a viewer or wearer of the combination apparatus 10 of the present invention than would be presented were the center line of the field of view of the display apparatus of the present invention to be coincident, or substantially coincident, with the horizontal.

Figure 7:
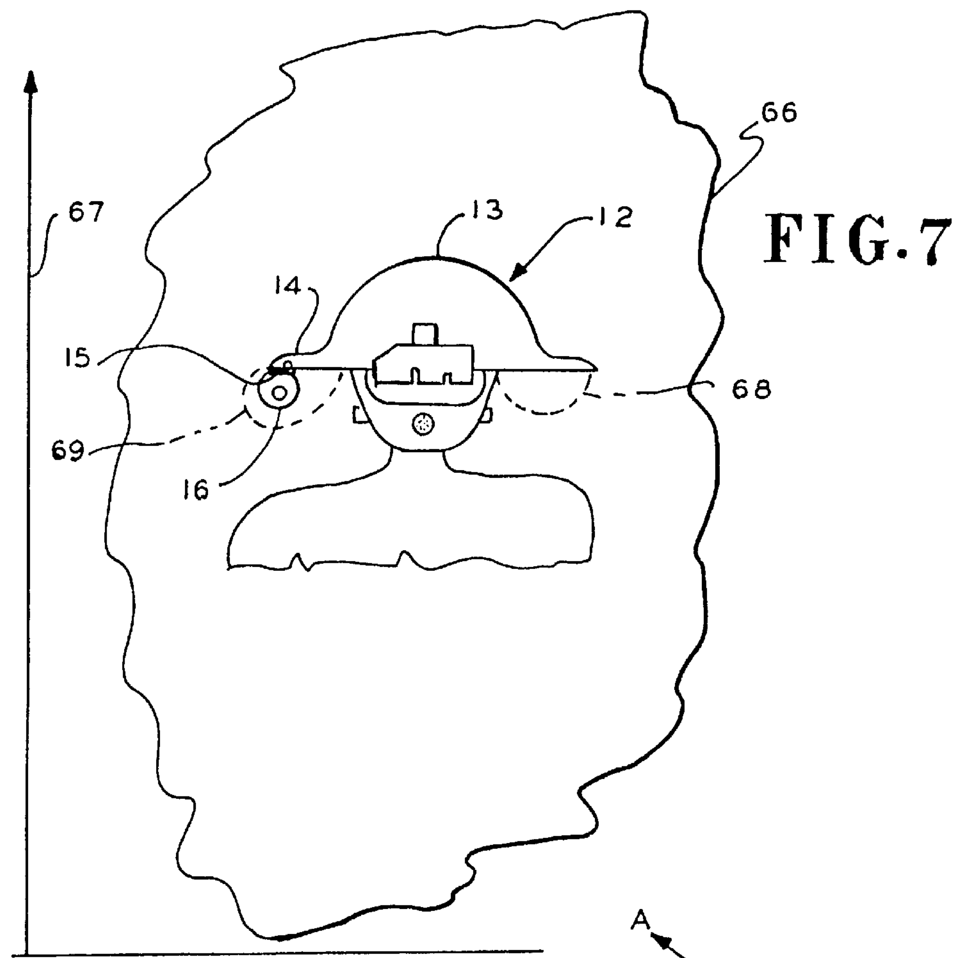
FIG. 7 is a diagrammatical illustration of a heated environment having stratified heat which increases vertically.

As known to those skilled in the fire fighting art and as known to those skilled in the fire helmet art, and referring to FIG. 7, upon a fire helmet 12 being present in a heated environment, indicated by irregular outline 66, the fire helmet 12, and a person wearing the fire helmet, experience stratified heat in that, as is known, the heat in the heated environment 66 increases vertically, as indicated by the arrow 67 and, as further known to those skilled in the art, an envelope of reduced heat is present underneath the helmet brim 14 which envelope is indicated diagrammatically by the dashed semi-circular lines 68 and 69. It will be further understood that in accordance with the present invention the mounting member 15, better seen in FIG. 1, mounts the infrared sensor camera 16 underneath the helmet brim 14 to cause the camera 16 to reside generally in said envelope of reduced heat, 68 and 69, to reduce the influence of the heated environment 66 on the camera 16.

Figure 8:
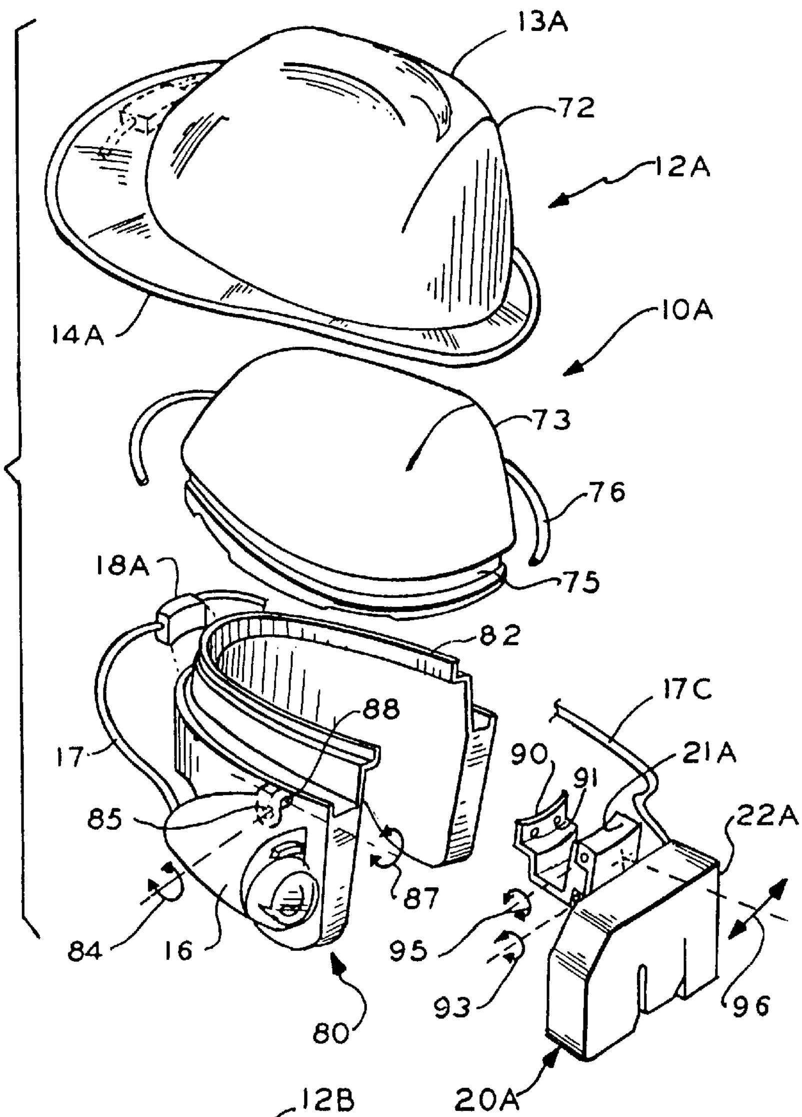
FIG. 8 is an exploded view of an alternate embodiment of the present invention including an inner deformable cap and a shroud.

An alternate embodiment of the combination head-protective helmet and thermal imaging apparatus of the present invention is illustrated in FIG. 8 and indicated by general numerical designation 10A. In this embodiment, the fire helmet indicated by general numerical designation 12A includes an outer hard shell 72 including a cap 13A and brim 14A and an inner deformable cap 73 mounted removably to the outer hard shell 72 in the manner taught in the above-noted incorporated U.S. Pat. Nos. 4,286,339 and 5,044,016. Such mounting, as is taught in such patents, is a safety feature which permits the outer shell 72 to separate from the inner deformable cap 73 such as, for example, on a fireman wearing the helmet and falling through a hole wherein the brim 14A catches upon the material surrounding the hole but the fireman's head is not caught in the outer shell, because the inner deformable cap 73 separates from the outer shell permitting the fireman to fall through the hole without the possibility of hanging; although not shown in FIG. 8, but shown in the incorporated patents, a head strap is mounted to the inner deformable cap 73 which includes a chin strap fastened around the fireman's chin. The inner deformable cap 73 is provided with a groove 75 in which is received a resilient member 76 to which the above-noted, but not shown, straps or cradle of straps are mounted. Also shown in FIG. 8 is a shroud, indicated by general numerical designation 80 and which, as known to the art, protects at least the ears of the wearer of the helmet 12A from heat and flame. The shroud 80 is provided with an upwardly extending member 82 which resides in the groove 75 and is wedged between the resilient member 76 and the inner deformable cap 73 to thereby mount the shroud 80 removably to the inner deformable cap 73. In this embodiment of the present invention, the thermal or infrared sensor camera 16 is mounted to the shroud so as to reside generally underneath the helmet brim 14A whereby the camera is protected from falling objects striking the top portions of the helmet cap 13A and brim 14A and also to cause the camera to reside within the envelope of reduced heat indicated in FIG. 7 and described above. It will be noted that in this embodiment the camera 16 is mounted for vertical rotation as indicated by the double headed arrow 84 by being mounted on a pin 85 and the camera is also mounted for pivotal movement in the horizontal as indicated by double headed arrow 87 by being mounted pivotally on pin 88. In this embodiment, it will be understood that the junction box 18, FIG. 2, may be mounted to the rear portion of the shroud 80 by suitable means not shown. The display apparatus 20A of this embodiment is mounted removably to the inner deformable cap 73 by being provided with an outwardly and upwardly extending member 90 providing a groove 91 which receives the resilient member 76 to wedge the member 90 between the resilient member and the cap 73 with the member 90 residing in the groove 75. The housing 22A is mounted pivotally to the mounting member 21A for first upward pivoting or tilting movement as indicated by the double headed arrow 93 to tilt the display apparatus 20A upwardly and away from the lens L, FIG. 1, to permit the wearer of the combination 10 to see through the lens L with his natural eyesight. The display apparatus 20 is provided with further upward pivoting movement as indicated by the double headed arrow 95 to permit the wearer of the combination 10 (FIG. 1) to further tilt the display apparatus 20A upwardly into a stowed position; these pivoting movements of the display apparatus 20A are taught in detail below. In addition, as indicated by the double headed arrow 96 in FIG. 8, the display apparatus 20A may be mounted to the mounting member 21A, for reciprocal movement leftwardly and rightwardly with respect to the eyes of the wearer of the combination apparatus 10, FIG. 1, to align the eyepieces 48 with the eyes of the wearer of the combination apparatus. This lateral reciprocal movement is also described in detail below.

Figure 9:
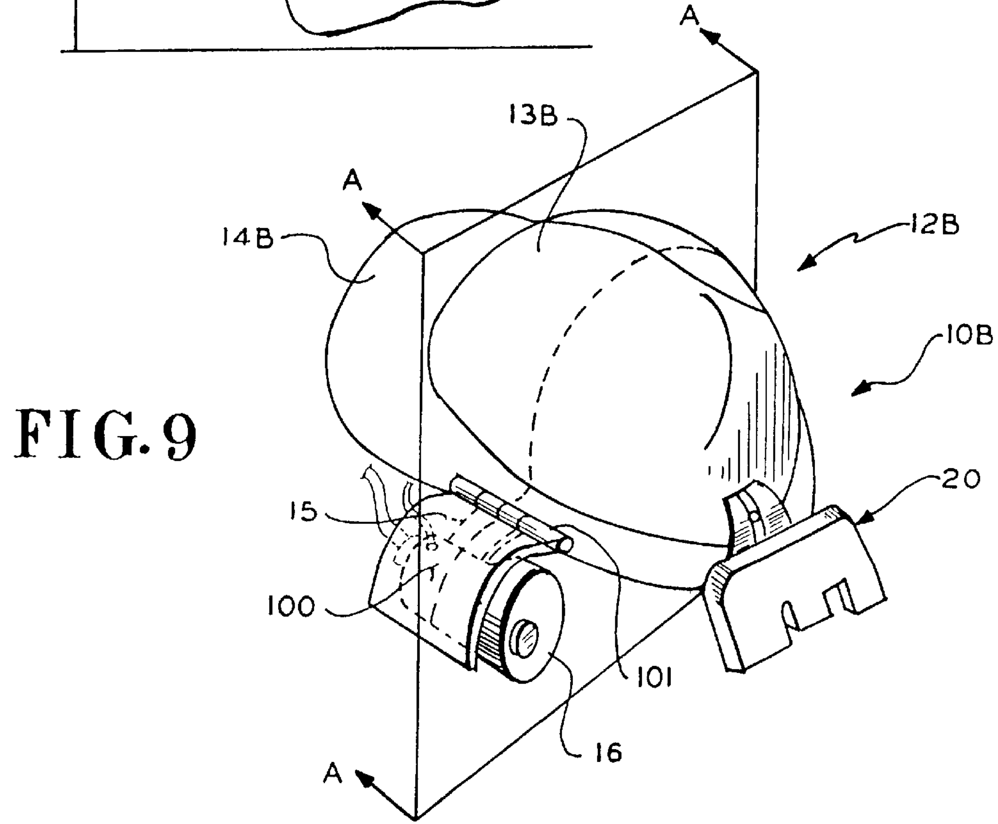
FIG. 9 is a perspective view of a further alternate embodiment of the present invention.

A further alternate embodiment of the combination head-protective helmet and thermal imaging apparatus of the present invention is illustrated in FIG. 9 and indicated by general numerical designation 10B. In this embodiment the thermal or infrared sensor camera 16 may be mounted underneath the brim 14B of the helmet 12B as shown in FIG. 1 and described above and the display apparatus 20 may also be mounted to the helmet 12B as shown in FIG. 1 and described above; alternatively, it will be understood that the camera 16 and display apparatus 20 may be mounted removably to an inner deformable cap, such as inner deformable cap 73 shown in FIG. 8, and in the manner described above, although such inner deformable cap is not shown in FIG. 9. In this embodiment, an outwardly and downwardly curved protective shield 100 is mounted pivotally to the helmet brim 14B by a suitable hinge 101 to provide the camera 16 with additional protection from falling objects striking the top of the helmet 12B and brim 14B and to provide the thermal camera with additional shielding upon the combination 10B residing in a heated environment such as the environment 66 indicated in FIG. 7. The protective shield 15 may be made of a suitable heat resistant plastic of the type known to the art.

Figure 9A:
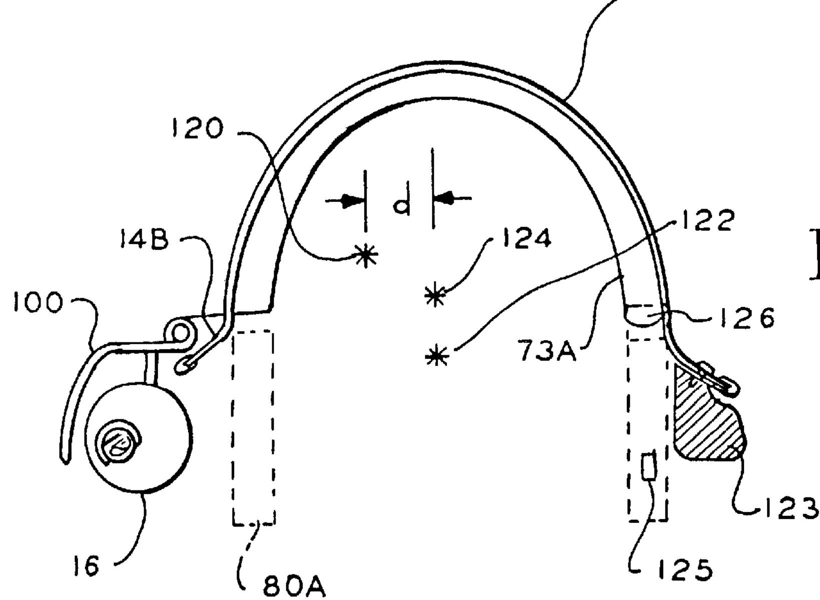

It will be understood by reference to FIG. 9A that upon the thermal camera 16 being mounted to the helmet brim 14 and outwardly of the helmet 12B the helmet and camera will have a combined center of mass 120 which will be offset by the distance d from the center of mass 122 of the head of the wearer of the helmet 12B. This distance d, due primarily to gravity acting on the camera 16, will produce counter clockwise torque as viewed in FIG. 9A causing discomfort to the wearer of the helmet 12B. This counter clockwise torque can be offset by the present invention by mounting a counter balance 123 to the helmet 128 such, as for example, to the helmet brim 14B substantially opposite to, and substantially equal in weight to, the camera 16. Such counter balance will produce a clockwise torque, as viewed in FIG. 9A, substantially cancelling the counter clockwise torque produced by the camera 16 effectively moving the combined center of mass of the helmet 12B, camera 16 and counterbalance rightwardly and downwardly to the point 124. This effectively reduces d to zero and places the center of mass 123 over the center of mass 122 which will substantially eliminate the aforementioned discomfort and fatigue otherwise caused to the head of the wearer of the helmet 12B without the counter balance 123. Alternatively, counter balance 123 may be mounted internally of a shroud 80A, shown in dashed outline in FIG. 9A but which shroud 80A may be substantially the same as the shroud 80 shown in FIG. 8. Such mounting of the counter balance is shown in dashed outline in FIG. 9A and indicated by numerical designation 125. Alternatively, upon the helmet 12B of FIG. 9A being provided with the inner deformable cap 73A, which may be the same as inner deformable cap 73 shown in FIG. 8, the counter balance may be mounted internally of the cap 73 as shown in the dashed outline indicated by numerical designation 126. For a further understanding of the counter balance feature shown in FIG. 9A and described above, reference may be made to FIGS. 9B, 9C and 9D wherein the center of mass 122 of the head of a person to wear the helmet is illustrated in perspective and wherein in FIG. 9C the center of mass 130 of the helmet 12', without the thermal camera or counter balance mounted thereto, is indicated by numerical designation 130 which, as will be noted from FIG. 9C, is displaced upwardly of the center of mass 122 of the head of the person to wear the helmet by the distance D. As will be further understood from FIG. 9D, the counter balance 123 in combination with the camera 16 effectively reduces the distance D, FIG. 9C, to the distance d which effectively moves the centers of mass closer together thereby substantially reducing fatigue to the head of the wearer of the helmet noted above. It will be understood that the centers of mass 122 and 130 can be made effectively coincident by adding a counter balance to the side of the helmet on which the camera 16 is mounted and additional counter balance to the rightward side of the helmet which will effectively reduce the distance d to 0 thereby making the centers of mass 122 and 123 substantially coincident and thereby substantially eliminating the above-noted fatigue or discomfort to the wearer of the helmet.

A further alternate embodiment of combination head-protective helmet and thermal imaging apparatus of the present invention is illustrated in FIG. 10 and indicated by general numerical designation 10C. In this embodiment the helmet brim 14C is provided with an integrally formed outwardly and downwardly extending portion 104 to further protect the thermal or infrared sensor camera 16 from falling objects striking the top portion of the helmet cap 13C and the brim 14C and to further shield the camera 16 from heat upon the combination 10C residing in a heated environment such as heated environment 66 shown in FIG. 7. It will be further understood that the outwardly and downwardly extending portion 104 of the helmet brim 14C also further places the camera 16 in an envelope of reduced heat underneath the helmet brim 14C and which envelope is indicated in FIG. 7 by dashed lines 68 and 69 and described above. The camera 16 may be mounted suitably to the helmet brim 14C such as for example by the mounting member 15 shown in FIG. 1 and indicated by the dashed rectangle 15C in FIG. 10.

Figure 11:
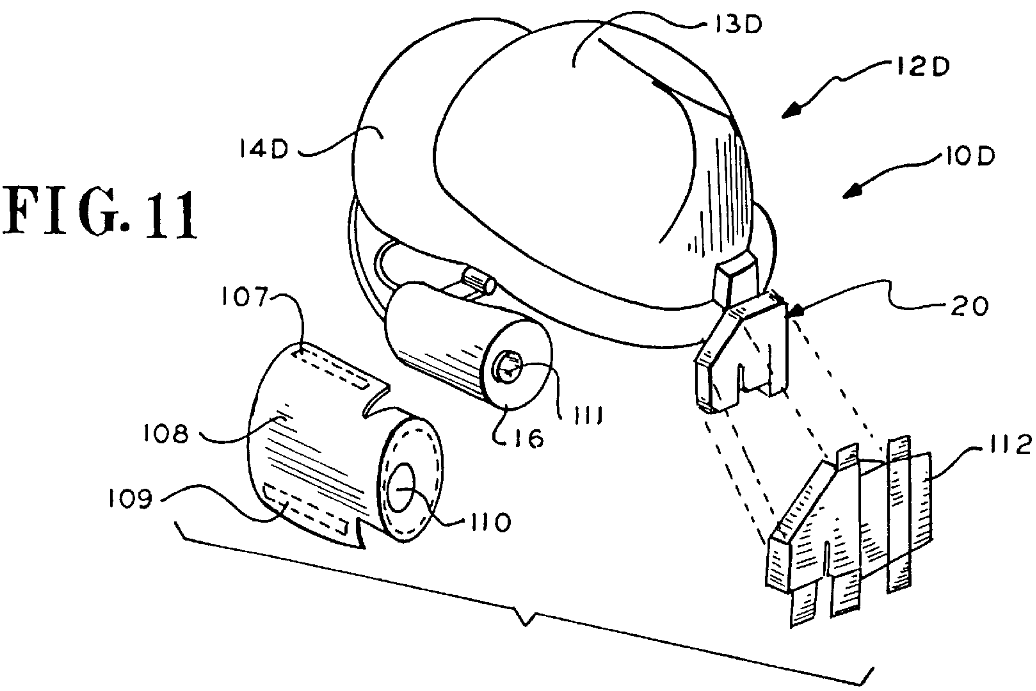
FIG. 11 is a perspective exploded view illustrating a still further embodiment of the present invention.

FIG. 11 illustrates a further alternate embodiment of the head-protective element and thermal imaging apparatus of the present invention which alternate embodiment is indicated by general numerical designation 10D. It will be understood that the thermal or infrared sensor camera 16 and display apparatus 20 may be mounted to the helmet 12D as taught in the earlier described embodiments and as shown in the earlier described FIGS., and in this embodiment the combination 10D further includes a first fire and heat protective insulated jacket 108 slightly larger than and complementary in shape to the shape of the camera 16 and for being mounted thereover and secured thereto such as, for example, by Velcro strips 107 and 109 shown in FIG. 11 in dashed outline; the jacket 108 is provided with a suitable opening or aperture 110 to expose the lens 111 of the camera 16. Similarly, a second fire and heat protective insulated jacket 112 slightly larger and complementary in shape to the display apparatus 20 is provided for fitting over and being secured to the display apparatus 20 such as, for example, by suitable Velcro strips, not shown.

Figure 12:
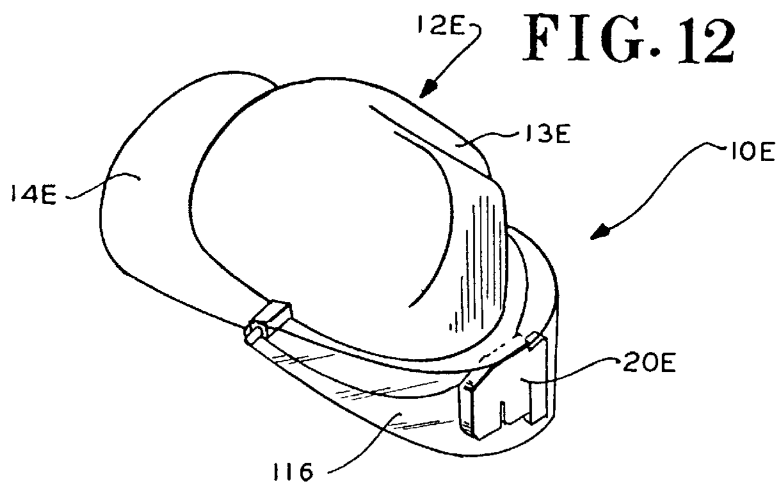
FIG. 12 is a perspective view illustrating a still further embodiment of the present invention.
Figure 13:
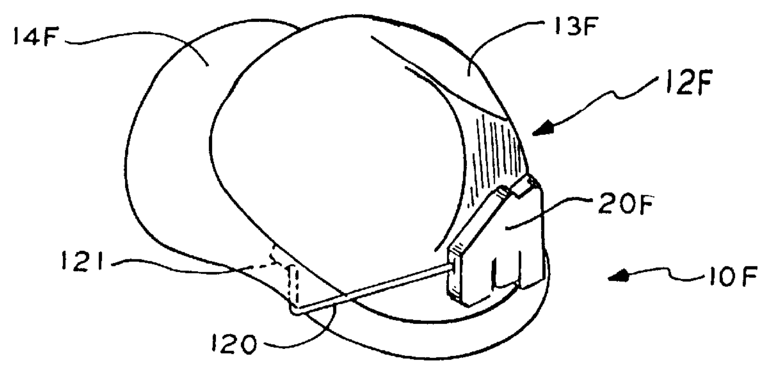
FIG. 13 is a perspective view illustrating a further embodiment of the present invention.

FIGS. 12 and 13 show other alternate embodiments of the present invention wherein as illustrated in FIG. 12 the display apparatus 20E may be suitably mounted to a transparent visor or face shield mounted pivotally to the cap 13E of the helmet 12E in the manner known to the art; the display apparatus 20E may be suitably mounted to the visor or face shield 116 such as, for example, by a suitable plastic or by suitable threaded fasteners. In FIG. 13, the display apparatus 12F may be suitably mounted to an elastic or adjustable strap 120 which may be suitably mounted to the underneath portion of the brim 14F by a suitable fastener 121 indicated in dashed outline; it will be understood that another strap and fastener are on the other side of the display apparatus F and are mounted in the same manner although such are not shown. In the embodiments of the present invention shown in FIGS. 12 and 13, the thermal or infrared sensor camera is not illustrated for clarity and simplicity of presentation. It will be understood that the pivotally mounted face shield 116 in the combination embodiment 10E permits the display apparatus 10E to be pivoted downwardly with the face shield 116 to present the display apparatus in front of the eyes of the wearer of the helmet 13E and in the embodiment 10F of FIG. 13 the elastic or adjustable straps permit the display apparatus 28 to be moved upwardly over the helmet 12F as shown in FIG. 13 and permit the display apparatus to be moved downwardly in front of the eyes of the wearer of the helmet 12F.

Referring again to FIG. 5, it will be generally understood that the display apparatus 20 may be mounted pivotally to the helmet 12 for movement into a plurality of in-use positions relative to the helmet and into a stowed position relative to the helmet. The mounting member 60 includes a dual pivot mounting arm 140 which is connected pivotally to the display apparatus 20 by pivot pin 142 and which is also mounted pivotally by pivot pin 143 to an in-use position lock arm 145. Arm 145 is mounted pivotally by pin 146 to a mounting base 148 which is mounted to the helmet 12 by suitable mounting means, not shown, such as suitable screws or bolts. The in-use position lock arm 145 is rotated about the pivot pin 146 only to move the display apparatus 20 into the stowed position.

Figure 14:
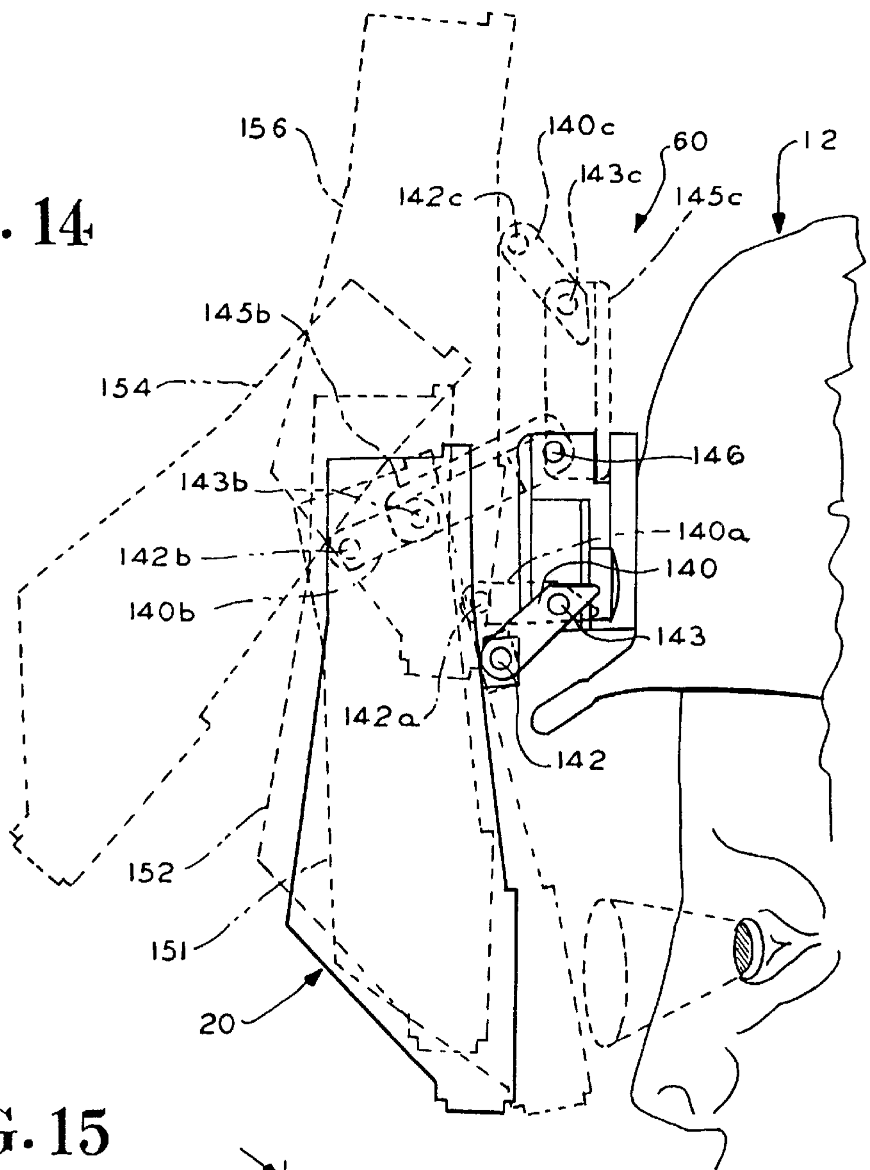
FIG. 14 is a multiple view drawing illustrating the operation of the mounting member of the present invention for mounting the display apparatus into a plurality of in-use positions and into an ultimate stowed position.

Referring now to FIG. 14, the display apparatus 20 shown in solid outline is shown in one of its in-use positions for viewing by the eye of the wearer of the helmet 12 as indicated diagrammatically in FIG. 14. Other in-use positions of the display apparatus 20 are shown in dashed outline and indicated by numerical designations 151 and 152. In-use position 151 demonstates the toe-in capability of the mounting member 60 wherein the display apparatus 20 pivots inwardly about the pivot pin 142. Dashed outline in-use position 152 demonstrates the raising and lowering capability of the mounting member 60 wherein the display apparatus 20 pivots both about the pivot pin 142 and 143 with the pivot pin 142 pivoting into the dashed outline position 142*a* and with dual pivot mounting arm 140 occupying the dashed outline position 140*a;* the dashed outline positions 151 and 152 are representative of a plurality, substantially infinite number, of in-use viewing position, that can be obtained by the mounting member 60 for the display apparatus 20. The dashed outline indicated by numerical designation 154 demonstrates a transition position of a display apparatus 20 and is indicative of the routing of the display apparatus 120 into its ultimate stowed position shown in dashed outline and indicated by numerical designation 156. It will be understood that upon the display apparatus 120 being routed into its ultimate position 156 the display apparatus 120 rotates about all three of the pivot pins 142, 143 and 146 with the pivot pins 142 and 143 occupying the dashed outline positions 142*b* and with the pivot pin 143 occupying the dashed outline position indicated by numerical designation 143*b* and it will be understood that in the transition position indicated by numerical designation 154 the dual pivot mounting arm 140 occupies the dashed outline position 140*b* and the in-use position lock arm 145 occupies the dashed outline position indicated by numerical designation 145*b*. Upon the display apparatus 20 being pivoted further upwardly into its ultimate stowed position indicated in dashed outline by numerical designation 156 it will be understood that the pivot pin 142 occupies the dashed line position indicated by numerical designation 142*c,* the pivot pin 143 occupies the dashed outline position indicated by numerical designation 143*c*, the dual pivot mounting arm 140 occupies the dashed outline position 140*c* and the in-use position lock arm 145 occupies the dashed outline position 145*c*.

Figure 15:
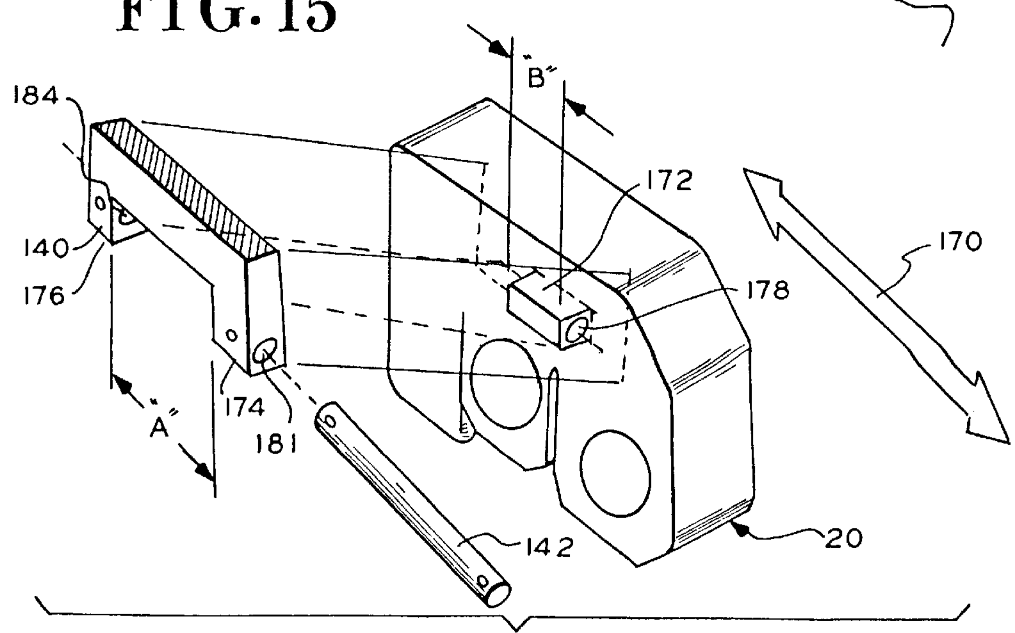
FIG. 15 is an exploded diagrammatical view in perspective illustrating the manner in which the display apparatus of the present invention may be mounted for reciprocal leftward and rightward movement for adjustment to the eyes of the wearer of the combination head-protective helmet and thermal imaging apparatus of the present invention.

FIG. 15 illustrates the manner in which the display apparatus 20 is mounted for reciprocal rightward and leftward movement, as indicated by the double headed arrow 170 to permit the display apparatus 20 be adjusted horizontally across the face of the wearer of the helmet, e.g. helmet 12 of FIG. 1, to accommodate for abnormalities wherein the eyes of the head of the wearer of the helmet may not be centered symmetrically with relation to the head of the wearer of the helmet. It will be understood that the dual pivot mounting arm 140 and the pivot pin 142 shown in FIG. 15 are the same as the correspondingly numbered elements shown in FIGS. 5 and 14. The display apparatus 20 is provided with an outwardly extending member 172 which may be formed integrally therewith or formed separately and suitably secured thereto. It will be noted that the member 172 has a width B which is less than the width A of the open space extending between the downwardly extending portions 174 and 176 of the dual pivot mounting arm 140. It will be further understood that the member 172 is provided with a cylindrical hole or passageway 178 slightly larger in diameter than the pivot pin 142. The pivot pin 142 extends through the hole or cylindrical passageway 181 formed in the downwardly extending member 174, through the hole or passageway 178 formed in the member 172, and through the hole or cylindrical passageway 184 formed in the downwardly extending portion 146 of the arm 140. This mounts the display apparatus 20 pivotally to the mounting pin 142, as described above, and also mounts the display apparatus 20 for the reciprocal rightward and leftward movement in the space between the downwardly extending members 174 and 176 as indicated by the double headed arrow 170. It will be understood that the reciprocal rightward and leftward movement indicated by the arrow 170 may be provided to the display apparatus 20 by other than the pivot pin 142 and may be, for example, provided along the pivot pins 143 and 146 shown in FIGS. 5 and 14.

It will be understood by those skilled in the art that many modifications and variations may be made in the present invention without departing from the spirit and the scope thereof.

What is claimed is:

1. Combination head-protective helmet and thermal imaging apparatus, for being worn by a person in a heated environment where stratified heat is present which increases vertically, comprising:

a head-protective helmet including a cap and a brim circumscribing said cap and extending downwardly and outwardly from said cap sufficiently to provide an envelope of reduced heat under said brim upon said head-protective helmet being present in said stratified heat;

thermal imaging apparatus including an infrared sensor camera for producing an infrared image of a scene or object and display apparatus which generates a visible image of said scene or object from said infrared image for viewing by the eyes of a person wearing said combination;

first mounting means for mounting said camera to said head-protective helmet substantially underneath said brim to protect said camera from falling objects striking said helmet and to cause said camera to substantially reside in said envelope of reduced heat to reduce the influence of said heated environment on said camera, said first mounting means mounting said infrared sensor camera to said head-protective helmet to locate said infrared sensor to the side of the face of said person wearing said combination; and second mounting means for mounting said display apparatus to said helmet in a position to permit the eyes of said person to see said visible image.

2. Combination according to claim 1 wherein said helmet includes an outer hard shell and an inner deformable cap mounted removably to said outer shell and wherein said first and second mounting means are for mounting said camera and said display systems to said inner deformable cap whereby said camera and said display system remain on said inner deformable cap in the event said outer shell is separated from said inner deformable cap.

3. Combination according to claim 2 wherein head-protective helmet further comprises a shroud mounted removably to said helmet and extending downwardly therefrom and wherein said first mounting means are for mounting said camera on said shroud generally underneath said brim.

4. Combination according to claim 2 wherein said second mounting means reside within said shroud and are for mounting said camera generally within said shroud.

5. Combination according to claim 2 wherein said second mounting means are for mounting said display apparatus on said shroud.

6. Combination according to claim 1 wherein said first mounting means mount said camera for rotation in both the horizontal and vertical directions.

7. Combination according to claim 1 wherein said second mounting means mount said display apparatus for movement in the horizontal and vertical directions.

8. Combination according to claim 1 wherein said combination further includes a generally curved protective shield mounted to said brim and extending outwardly and downwardly over at least a portion of said camera to further protect said camera from said falling objects and to shield said camera from said stratified heat.

9. Combination according to claim 1 wherein said display system has a field of view having a centerline and wherein said centerline is displaced downwardly at an angle with respect to the horizontal.

10. Combination according to claim 9 wherein said angle is between 0° to about 10°.

11. Combination according to claim 1 wherein said helmet brim is provided with an integrally formed portion extending outwardly and downwardly over at least a portion of said camera to further protect said camera from said falling objects and to shield said camera from said stratified heat.

12. Combination according to claim 1 wherein said combination further includes a first fire protective insulated jacket for covering said camera and a second fire protective insulated jacket for covering said display apparatus, said first fire protective insulated jacket being slightly larger and complementary in shape to the shape of said camera and said second fire protective insulated jacket being slightly larger and complementary in shape to the shape of said display apparatus.

13. Combination according to claim 1 wherein said combination further includes a substantially transparent face shield mounted pivotally to said helmet and wherein said display apparatus is mounted to said face shield.

14. Combination according to claim 1 wherein said combination further comprises elastic or adjustable straps mounted to said helmet and which straps mount said display apparatus to said helmet.

15. Combination according to claim 1 wherein said camera imparts torque to said helmet causing fatigue to the head of said person and wherein said combination further includes a counter balance mounted to said helmet substantially opposite said camera and substantially equal in weight to said camera and said counter balance imparting torque to said helmet substantially canceling said torque imparted by said camera and substantially eliminating said fatigue to said head of said person.

16. Combination according to claim 15 wherein said helmet includes an outer hard shell and an inner deformable cap mounted removably to said outer shell and wherein said counter balance is mounted to said inner deformable cap.

17. Combination according to claim 15 wherein said helmet includes a shroud mounted removably to said helmet and extending downwardly therefrom, and wherein said camera and said counter balance are mounted to said shroud.

18. Combination according to claim 15 wherein said helmet includes a hard outer shell and a deformable inner cap mounted removably to said outer shell and wherein said counter balance is mounted to said inner deformable cap.

19. Combination according to claim 18 wherein said display apparatus includes a television tube, signal processing means for receiving thermal image signals from said camera and for converting said thermal image signals to TV signals for transmission to said television tube to cause said television tube to produce a visible television image of said scene or object carried by light rays emanating from said television tube, a pair of eyepieces and optical means through which said light rays are transmitted to said eyepieces, said optical means for converting said TV image to a pair of intermediate real images of said scene or object in advance of said pair of eyepieces, said pair of eyepieces for converting said pair of intermediate real images to a pair of virtual images of said scene or object for viewing by the eyes of said person through said eyepieces.

20. Combination according to claim 19 wherein said optical system includes a field flattener lens mounted in front of said television tube, a beam splitter, a relay lens group mounted intermediate said field flattener lens and said beam splitter and a pair of field lens mounted intermediate said beam splitter and said eyepieces, and wherein said pair of eyepieces comprise a pair of aspheric lens.

21. Combination according to claim 19 wherein said camera has a real view field angle and wherein said virtual images have a virtual image field angle and wherein said field angles are substantially equal whereby said virtual images of said scene or object are substantially the same as the size of said scene or object of which said camera produces said infrared image.

* * * * *